United States Patent [19]

Fitzpatrick et al.

[11] Patent Number: 5,436,963
[45] Date of Patent: Jul. 25, 1995

[54] TELEPHONE ANSWERING METHOD AND APPARATUS

[75] Inventors: Gregory P. Fitzpatrick, Rochester, Minn.; William J. Johnson, Flower Mound; Marvin L. Williams, Lewisville, both of Tex.

[73] Assignee: International Business Machines Corporation, Armonk, N.Y.

[21] Appl. No.: 375,056

[22] Filed: Jan. 19, 1995

Related U.S. Application Data

[63] Continuation of Ser. No. 998,197, Dec. 30, 1992, abandoned.

[51] Int. Cl.⁶ .................. H04M 3/58; H04M 1/64
[52] U.S. Cl. ............................ 379/212; 379/67; 379/70; 379/201; 379/214
[58] Field of Search .............. 379/67, 69, 70, 76, 379/88, 89, 158, 161, 201, 207, 210, 211, 212, 213, 214

[56] References Cited

U.S. PATENT DOCUMENTS

| | | | |
|---|---|---|---|
| 4,313,035 | 1/1982 | Jordan et al. | 379/207 |
| 4,608,460 | 8/1986 | Carter et al. | 379/201 |
| 4,752,951 | 6/1988 | Konneker | 379/211 |
| 4,860,342 | 8/1989 | Danner | 379/354 |
| 5,008,930 | 4/1991 | Gawrys et al. | 379/210 |
| 5,046,188 | 9/1991 | Molnar | 379/94 |
| 5,093,854 | 3/1992 | Sucato | 379/97 |
| 5,109,405 | 4/1992 | Morganstein | 379/210 |
| 5,138,655 | 8/1992 | Takashima et al. | 379/211 |

(List continued on next page.)

FOREIGN PATENT DOCUMENTS

| | | |
|---|---|---|
| 0510411 | 10/1992 | European Pat. Off. . |
| 60-109363 | 6/1985 | Japan . |
| 62-122363 | 6/1987 | Japan . |
| 62-219740 | 9/1987 | Japan . |

(List continued on next page.)

OTHER PUBLICATIONS

R. J. Torres "Graphical Phone Time Billing and Accounting" Research Disclosure, No. 292, published Aug., 1988.

S. P. Heggestad, B. B. Merwald and J. M. Pringle "Graphic Office Interface" IBM Technical Disclosure Bulletin, vol. 34, No. 1, pp. 266–269, published Jun., 1991.

D. L. Griffin, S. F. Griffin and P. J. Keane "Technique for Initiating a Conference Call from a Calendar Database" IBM Technical Disclosure Bulletin, vol. 33, No. 9, p. 58, published Feb., 1991.

A. M. Peters and J. P. Vincent "Printing Calendar Day Flags" IBM Technical Disclosure Bulletin, vol. 33, No. 7, pp. 275–276, publ. Dec., 1990.

A. D. Moldover "Enhanced Personal Reminder Facility" IBM Technical Disclosure Bulletin, vol. 30, No. 2, p. 656, published Jul., 1987.

K. P. McGlynn "Mail Paging and Reminder Forwarding System" IBM Technical Disclosure Bulletin, vol. 29, No. 12, pp. 5201–5202, publ. May, 1987.

C. Cree, G. J. Landry, K. J. Scully and H. S. Singh "Generalized Request/Reply Mechanism for Use in (List continued on next page.)

Primary Examiner—James L. Dwyer
Assistant Examiner—Scott L. Weaver
Attorney, Agent, or Firm—Norman L. Gundel

[57] ABSTRACT

A method and data processing system are disclosed for processing incoming telephone calls. In one embodiment, the invention, in response to the receipt of an incoming telephone call, searches a calendar database for information describing the scheduled location of the party called. At the caller's option, the invention may transfer the incoming call to the scheduled location or telephone number of the party called or may inform the caller of the scheduled location or telephone number of the party called. The invention may search a directory database for a telephone number associated with the information describing the scheduled location of the party called if the information describing the scheduled location of the party called does not include a telephone number.

10 Claims, 3 Drawing Sheets

U.S. PATENT DOCUMENTS

| | | | |
|---|---|---|---|
| 5,155,763 | 10/1992 | Bigus et al. | 379/113 |
| 5,175,760 | 12/1992 | Ohashi et al. | 379/212 |
| 5,239,577 | 8/1993 | Bates et al. | 379/201 |
| 5,243,645 | 9/1993 | Bissell et al. | 379/211 |
| 5,270,701 | 12/1993 | Ito et al. | 379/211 |
| 5,375,161 | 12/1994 | Fuller et al. | 379/88 X |
| 5,388,150 | 2/1995 | Schneyer et al. | 379/67 |

FOREIGN PATENT DOCUMENTS

| | | |
|---|---|---|
| 63-078642 | 4/1988 | Japan . |
| 01162063 | 6/1989 | Japan . |
| 03057357 | 3/1991 | Japan . |
| 04273645 | 9/1992 | Japan . |

OTHER PUBLICATIONS

Asynchronous Distributed Enviroments" IBM Technical Disclosure Bulletin, vol. 29, No. 8, pp. 3345–3357, publ. Jan., 1987.

S. J. Boies, J. D. Gould, W. A. Notz, J. T. Richards and J. W. Schoonard "User Interface for Audio Communication System" IBM Technical Disclosure Bulletin, vol. 25, No. 7A, pp. 3371–3377, publ. Dec., 1982.

C. H. Sederholm and J. W. Van den Berg "Intelligent Telephone" IBM Technical Disclosure Bulletin, vol. 23, No. 9, pp. 4006–4008, publ. Feb., 1981.

G. P. Fitzpatrick, B. K. Jackson and M. L. Williams "An Electronic Calendar Communication Device Research Disclosure", No. 334, publ. Feb., 1992.

J. P. Vincent and M. L. Willilams "Methodology for Electronic Mail Negotiation for A Reply–After Time Period" IBM Technical Disclosure Bulletin, vol. 34, No. 6, pp. 465–466, publ. Nov., 1991.

S. G. Berkson, S. B. Joshi and A. Litman "Computer–Telephone Software Interface" IBM Technical Disclosure Bulletin, vol. 33, No. 4, pp. 149–150, publ. Sep., 1990.

M. E. Dillon, R. S. Hurley and L. C. Queen "Intelligent Network Phone Mail" IBM Technical Disclosure Bulletin, vol. 33, No. 1A, publ. Jun., 1990.

J. P. Vincent "Calandar Call Items" IBM Technical Disclosure Bulletin, vol. 32, No. 12, pp. 124–125, publ. May, 1990.

H. F. Hertel, M. D. McConaughy and J. H. Wilson "User/Answering Machine Interface for Handling Incoming Telephone Calls" IBM Technical Disclosure Bulletin, vol. 29, No. 4, p. 1540, publ. Sep., 1986.

S. S. Soo "Interfacing a Computer to A Telephone Exchange" IBM Technical Disclosure Bulletin, pp. 1506–1511, publ. Sep., 1976.

P. F. J. Smeenk "Sopho–Supervisor 50: An Intelligent Workstation for SOPHO–PABXs" Philips Telecommunication Review vol. 46, No. 4, pp. 47–61, published Dec., 1988, Hilversum NL.

TELEPHONE ANSWERING METHOD AND APPARATUS

The application is a continuation of commonly owned application Ser. No. 07/998,197, filed Dec. 30, 1992 and now abandoned.

BACKGROUND OF THE INVENTION

1. Field of the Invention

The present invention relates to telephone answering systems and in particular to a telephone answering system that, upon receipt of an incoming call, can inform a caller of a callee's whereabouts and connect the caller to the callee.

2. Description of the Related Art

A telephone answering system responds to an incoming telephone call if the call is not answered by a person. Such systems may play a prerecorded message or record a message from the caller. Some such systems may offer the caller additional choices, such as the ability to access individual extensions by dialing extension numbers or individual persons or departments by spelling the person's or department's name on the caller's telephone keypad. Telephone answering systems may also offer a caller, through the use of the caller's keypad, the ability to connect to a backup person in the absence of the party called, the person to whom the call is directed.

However, a caller may still prefer to speak directly to the party called, or callee. Thus, many telephone systems allow an individual, called a user, to program the system to transfer to another telephone number calls directed to the user's telephone number. However, a user with multiple engagements away from his telephone may have to separately route his incoming calls to a telephone at each of the locations he expects to visit. Furthermore, such programming of the telephone, and particularly the repeated reprogramming of the telephone, represent an inconvenience to the user.

Therefore, a system is desired that can access a user's electronic calendar and, when the user is absent from his telephone, route incoming calls to the location where the user is scheduled to be.

SUMMARY OF THE INVENTION

In accordance with the present invention, a method and data processing system are disclosed for processing incoming telephone calls. In one embodiment, the invention, in response to the receipt of an incoming telephone call, searches a calendar database for information describing the scheduled location of the party called. At the caller's option, the invention may transfer the incoming call to the scheduled location or telephone number of the party called or may inform the caller of the scheduled location or telephone number of the party called. The invention may search a directory database for a telephone number associated with the information describing the scheduled location of the party called if the information describing the scheduled location of the party called does not include a telephone number.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

This application incorporates by reference concurrently filed, commonly owned United States patent application Ser. No. 07/998,274, filed Dec. 30, 1992 entitled "Telephone Calling Method and Apparatus."

Figure 1:
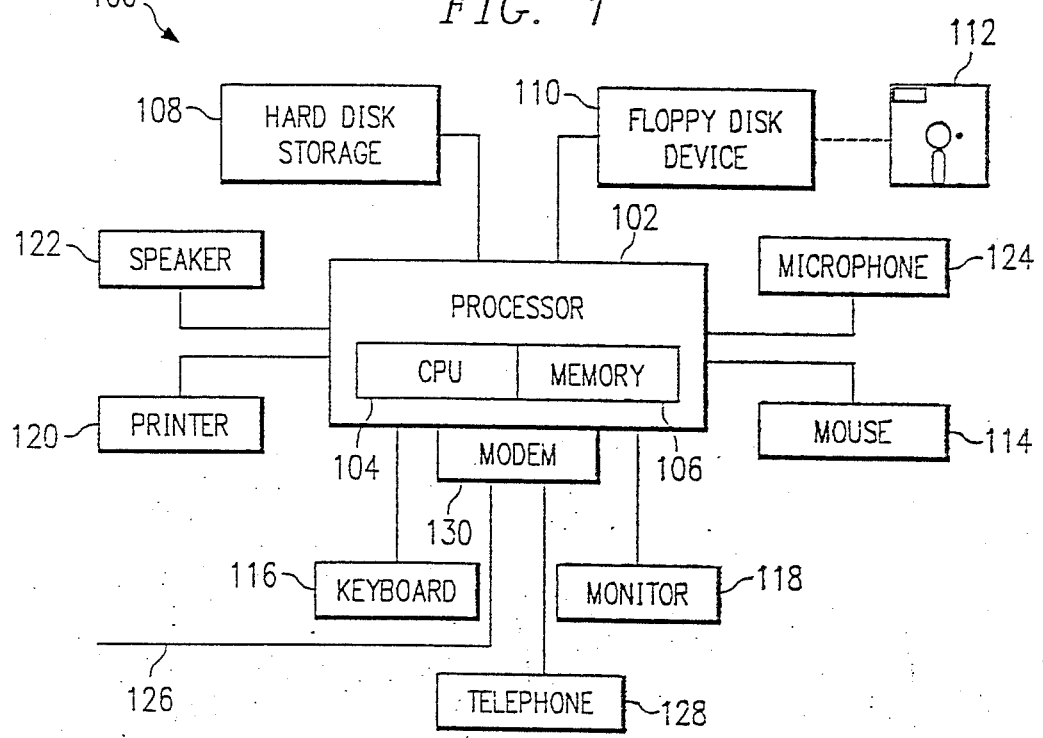
FIG. 1 is a block diagram of an apparatus used in performing the method of a preferred embodiment of the present invention and forming a part of the apparatus of a preferred embodiment of the present invention.

With reference now to the figures, and in particular with reference to FIG. 1, there is shown, in block diagram form, an apparatus according to the present invention. The apparatus includes a data processing system 100. The data processing system 100 includes a processor 102, which includes a central processing unit (CPU) 104 and memory 106. Additional memory, such as a hard disk file storage 108 and a floppy disk device 110, may be connected to the processor 102. Floppy disk device 110 may receive a removable diskette 112 which may have computer program code recorded thereon that implements portions of the present invention in the data processing system 100. The data processing system 100 also includes user interface hardware, such as a mouse 114, a keyboard 116 and a microphone 124, for allowing user input to the processor 102. The data processing system 100 also includes display hardware, such as a monochrome or color display monitor 118 and a monochrome or color display printer 120, for presenting visual information to the user. The data processing system may also include a speaker 122 for presenting audio information to the user. Connected to the data processing system 100, preferably through a modem 130, is a telephone line 126 and a telephone 128.

The data processing system is configured and equipped to serve as a telephone answering system for incoming calls on telephone line 126 that are not answered by a live person using, for example, telephone 128. A person, called a user, operating the data processing system 100 or the telephone 128 can record a message in the data processing system 100. If an incoming telephone call arrives on telephone line 126 and is not answered by a person, the data processing system 100 may answer the call and play the prerecorded message to the caller. The data processing system 100 may offer the caller the option to record a voice message that the caller wishes to leave.

In accordance with the present invention, the data processing system 100 is provided with an electronic calendar database 132 and also with an electronic directory database 134. The electronic calendar database 132 allows the user or other persons to record calendar entries to the user's calendar for various times throughout the day. Each entry in the electronic calendar database 132 may include information describing the user's scheduled location. This information describing the user's scheduled location may include the names of persons the user expects to meet with, the locations of such meetings, and an external telephone number or internal telephone extension at the location of such meetings. The electronic directory database 1 includes information such as the names, addresses and external telephone numbers or internal telephone extension numbers of persons. The data processing system 100 is also equipped with a text-to-speech synthesizer.

In accordance with the present invention, when a person does not answer an incoming call on telephone line 126 and the data processing system 100 answers the incoming call instead, the data processing system 100 offers the caller the option of accessing the user's calendar. By accessing the calendar of the party called, who is the user, the data processing system is able to search for information describing the scheduled location of the user at the time of the call. At the caller's option, the data processing system will retrieve the user's current calendar entry, convert the entry into speech using the text-to-speech synthesizer and recite the calendar entry to the caller over the telephone line 126. Further, also at the caller's option, the data processing system may retrieve from the directory a telephone number or extension associated with a name or an address appearing in the calendar entry. The data processing system may also modify any internal extension numbers for use by external telephones. Additionally, in a telephone system equipped for transferring incoming calls, the data processing system may offer the caller the option of being transferred to a telephone number retrieved by the data processing system.

Figure 2A:
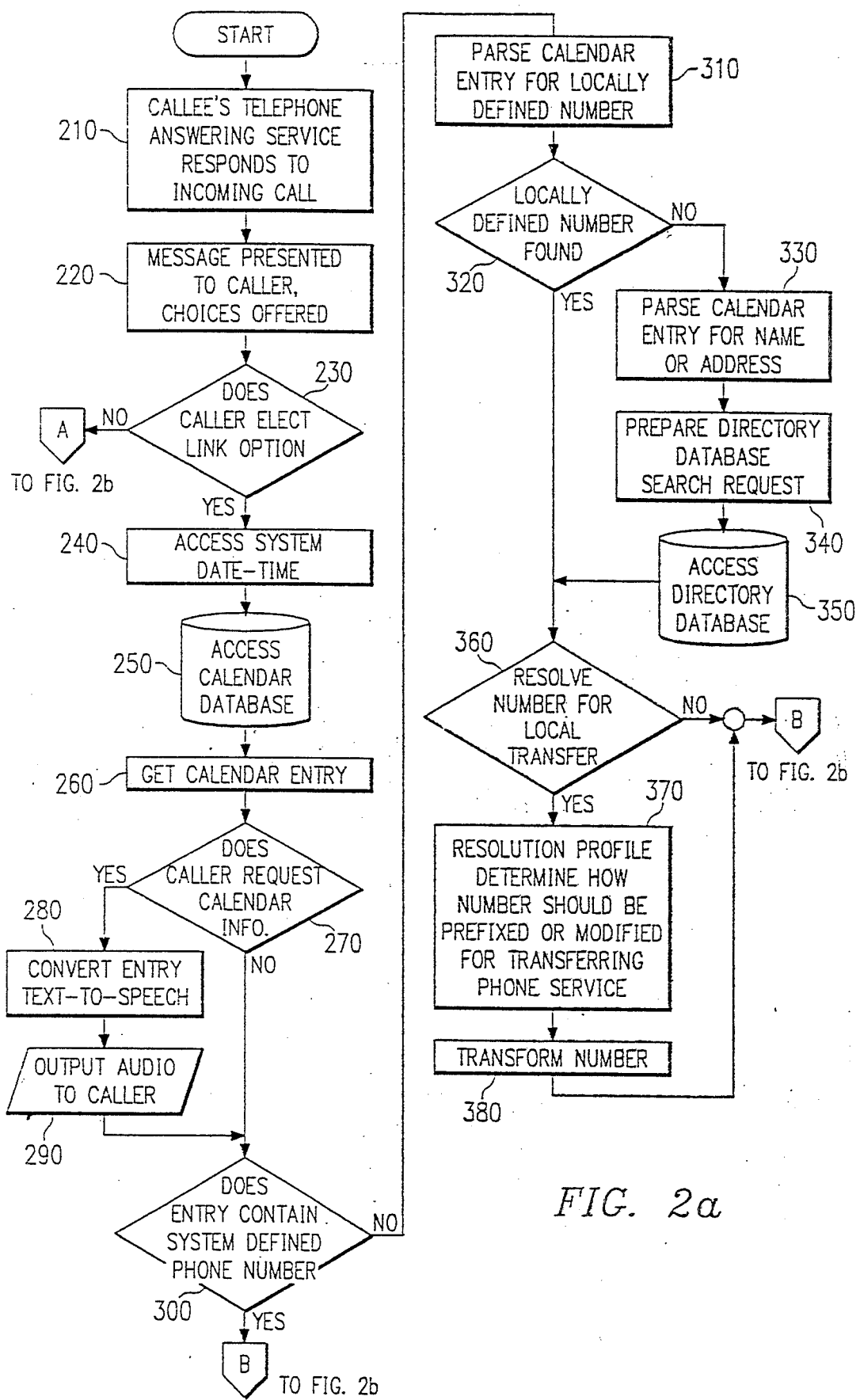
FIGS. 2a and 2b are a high level logic flowchart illustrating the method of a preferred embodiment of the present invention.
Figure 2B:
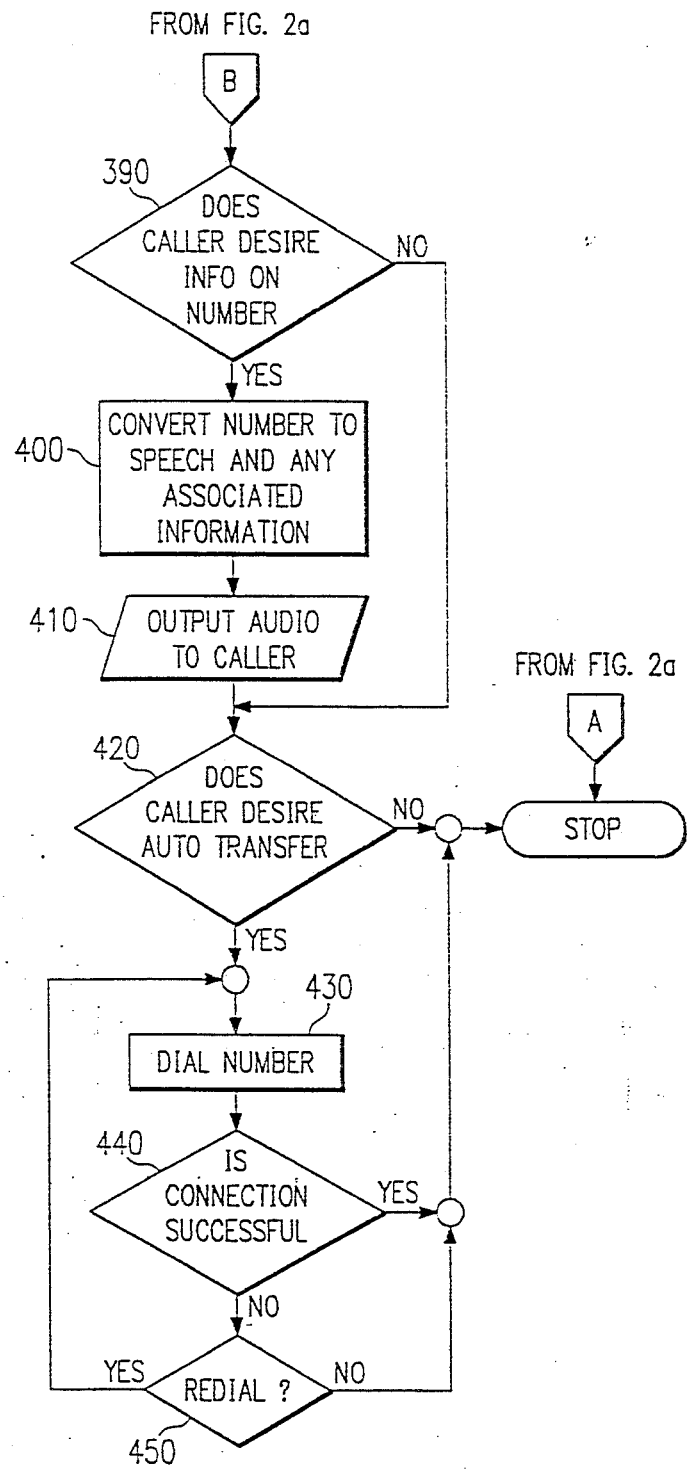

With reference now to FIGS. 2a and 2b, there is depicted a high level flowchart which illustrates the method of a preferred embodiment of the present invention. The process begins at block 210 when the telephone answering service of the data processing system responds to an incoming but otherwise unanswered telephone call arriving on telephone line 126. After answering the call, the process proceeds to block 220 and the data processing system may present a prerecorded message to the caller and may offer choices, such as those choices described above, from which the caller may select, as through use of the caller's telephone keypad. In accordance with this invention, one of these choices offers the option of accessing or linking to the user's calendar. The process then proceeds to block 230 and determines whether the caller has elected the option of accessing or linking to the user's calendar. If no, the process proceeds to FIG. 2b and terminates.

Returning to FIG. 2a, if the caller has elected to link to the user's calendar, the process proceeds from block 230 to block 240 and accesses the current system date and time. The process then proceeds to block 250 and accesses the calendar data base maintained by the data processing system, which contains the user's electronic calendar. The process then proceeds to block 260 and gets the user's calendar entry for the current date and time. The process then proceeds to block 270 and allows the caller to request calendar information. If calendar information is requested, the process proceeds to block 280 and converts the user's current calendar entry to speech using the text-to-speech synthesizer of the data processing system. The process then proceeds to block 290 and outputs this audio speech to the caller using the telephone line 126. Alternatively, this information may be output to a display panel of the caller's telephone if it is equipped to display visual characters. The process then proceeds to block 300.

Returning to block 270, if the caller does not request calendar information, the process proceeds directly from block 270 to block 300. In block 300, the data processing system determines whether the current calendar entry contains a complete telephone number. Completeness of the telephone number is defined by the system, for example, a full seven digit telephone number or a full ten digit area code and telephone number. The complete telephone number may be contained in a dedicated telephone number field of the user's electronic calendar entry. If no such number is contained in the user's current calendar entry, the process proceeds from block 300 to block 310.

In block 310, the process parses the current calendar entry for a locally defined telephone number. Such a number may include, for example, a local extension, a private network number, or fewer than the customary seven or ten digits. The process then proceeds to block 320, in which it is determined whether a locally defined number was found in block 310. If yes, the process proceeds from block 320 to block 360.

Returning to block 320, if no locally defined number was found, the process proceeds from block 320 to block 330 and parses the current calendar entry for a name or an address or location. The process then proceeds to block 340 and uses any name, address or location found in block 330 to prepare a directory data base search request. The process then proceeds to block 350 and accesses the directory data base and performs the search using the search request prepared in block 340, returning any telephone number associated with the names, addresses or locations in the search request. If a number is retrieved, the process then proceeds to block 360. If no number is retrieved, error processing, not shown, advises the caller and the process terminates.

In block 360, the process determines whether any telephone number returned needs to be resolved into a sufficient telephone number for local transferring of the call. As discussed above, a telephone number located by parsing the current calendar entry or returned by the directory database may be other than a conventional seven digit or ten digit number. If resolution is needed, the process proceeds to block 370 and accesses a resolution profile which specifies how a number should be prefixed or modified. For example, an internal five digit extension may require the addition of a two digit prefix to form a conventional seven digit phone number. A private network number may require conversion to a public network area code and exchange. The process then proceeds from block 370 to block 380 and performs the actual transformation of the number into an acceptable telephone number. The process then proceeds to block 390.

Returning to block 360, if resolution of the telephone number is not required, the process proceeds directly from block 360 to block 390 of FIG. 2b. In block 390, the caller may select whether he wishes to receive information on the telephone number. If yes, the process proceeds from block 390 to block 400 and converts the telephone number and any associated information, such as a name or address associated with the telephone number, from text to speech using the text-to-speech synthesizer of the data processing system 100. The process then proceeds to block 410 and outputs the speech as audio to the caller over the telephone line 126. Alternatively, the information may be displayed on a visual display panel of the caller's telephone, if it is so equipped. The process then proceeds to block 420.

Returning to block 390, if the caller does not wish to receive information on the telephone number, the process proceeds directly to block 420, where the caller may specify whether he wishes his call transferred. If no, the process terminates. If yes, the process proceeds from block 420 to block 430 and transfers the call to the appropriate telephone number. The process then proceeds to block 440 for a determination of whether the connection is successful. If the connection is successful, the process terminates. If the connection is not successful, the process proceeds to block 450 and allows the caller to specify whether to re-dial. If yes, the process returns to block 430, described above. If no, the process terminates.

Upon reference to the foregoing, it will be appreciated that the applicants have provided a novel and useful telephone answering method and apparatus. While the invention has been particularly shown and described with the reference to a preferred embodiment and process, it will be understood that various changes in form and detail may be made therein without departing from the spirit and scope of the invention.

What is claimed is:

1. A method, performed in a data processing system, for processing incoming telephone calls to a telephone number, which telephone number is associated with a party called, said data processing system including an electronic calendar database having information describing scheduled locations of the party called at various dates and times, and said data processing system further including an electronic directory database of names and telephone numbers of parties, wherein said electronic directory database is separate from said electronic calendar database, the method comprising the computer implemented step of:
   in response to receipt of an incoming telephone call to the party called and caller input, searching electronic calendar database for information describing the scheduled location of the party called at the date and time of the receipt of the incoming telephone call;
   determining that the information of the electronic calendar database describing the scheduled location of the party called does not include a telephone number of the scheduled location of the party called; and
   searching the electronic directory database for a telephone number of the scheduled location of the party called which is associated with the information describing the scheduled location of the party called.

2. The method of claim 1, further comprising the computer implemented step of informing the caller of the scheduled location of the party called.

3. The method of claim 1, wherein the electronic directory database includes a telephone number associated with the information describing the scheduled location of the party called.

4. The method of claim 3, further comprising the computer implemented step of transferring the incoming telephone call to the telephone number associated with the information describing the scheduled location of the party called.

5. The method of claim 3, further comprising the computer implemented step of informing the caller of the telephone number associated with the information describing the scheduled location of the party called.

6. A data processing system for processing incoming telephone calls to a telephone number, which telephone number is associated with a party called, comprising:
   an electronic calendar database having information describing scheduled locations of the party called at various dates and times;
   an electronic directory database of names and telephone numbers of parties, wherein said electronic directory database is separate from said electronic calendar database;
   means for answering an incoming telephone call to the party called;
   means for searching, in response to receipt of the incoming telephone call and called input, the electronic calendar database for information describing a scheduled location of the party called at the date and time of the receipt of the incoming telephone call;
   means for determining that the information of the electronic calendar database describing the scheduled location of the party called does not include a telephone number of the scheduled location of the party called; and
   means for searching the directory database for a telephone number of the scheduled location of the party called which is associated with the information describing the scheduled location of the party called.

7. The data processing system of claim 6, further comprising means for informing the caller of the scheduled location of the party called.

8. The data processing system of claim 6, wherein the electronic directory database includes a telephone number associated with the information describing the scheduled location of the party called.

9. The data processing system of claim 8, further comprising means for transferring the incoming telephone call to the telephone number associated with the information describing the scheduled location of the party called.

10. The data processing system of claim 8, said data processing system further comprises means for informing the caller of the telephone number associated with the information describing the scheduled location of the party called.

* * * * *